United States Patent [19]

Dernie

[11] Patent Number: 4,861,066
[45] Date of Patent: Aug. 29, 1989

[54] VEHICLE SUSPENSION SYSTEMS

[75] Inventor: Frank W. Dernie, Wantage, United Kingdom

[73] Assignee: Williams Grand Prix Engineering Limited, Oxfordshire, United Kingdom

[21] Appl. No.: 187,952

[22] Filed: Apr. 29, 1988

[30] Foreign Application Priority Data

Apr. 30, 1987 [GB] United Kingdom ............... 8710240

[51] Int. Cl.$^4$ .............................................. B60G 11/26
[52] U.S. Cl. .................................................. 280/707
[58] Field of Search ................................ 280/707, 714

[56] References Cited

U.S. PATENT DOCUMENTS 4,468,050 8/1984 Woods et al. ..................... 280/707
4,693,493 9/1987 Ikemoto et al. ................... 280/707

FOREIGN PATENT DOCUMENTS

| 0001009 | 3/1975 | European Pat. Off. . |
| 0143984 | 6/1985 | European Pat. Off. . |
| 1011095 | 11/1965 | United Kingdom . |
| 1174149 | 12/1969 | United Kingdom . |
| 1197812 | 7/1970 | United Kingdom . |
| 1367320 | 9/1974 | United Kingdom . |
| 1384454 | 2/1975 | United Kingdom . |
| 1419091 | 12/1975 | United Kingdom . |
| 1450696 | 9/1976 | United Kingdom . |
| 1466101 | 3/1977 | United Kingdom . |
| 1484673 | 9/1977 | United Kingdom . |
| 1488254 | 10/1977 | United Kingdom . |
| 2025863 | 1/1980 | United Kingdom . |
| 1587614 | 4/1981 | United Kingdom . |
| 2097344 | 11/1982 | United Kingdom . |
| 2170155 | 7/1986 | United Kingdom . |

Primary Examiner—Charles A. Marmor
Assistant Examiner—R. Weaver
Attorney, Agent, or Firm—Flynn, Thiel, Boutell & Tanis

[57] ABSTRACT

A vehicle suspension system has a gas-spring hydraulic strut for each of its four wheels. Each liquid actuator chamber of the struts at one end of the vehicle is connected to further chamber in the in the diagonally opposite strut, which further chamber acts in the opposite direction to the actuator chamber of that strut. A linear potentiometer within each strut provides a signal representative of the strut length to an on-board computer, which, when it detects a difference in the signal from any strut sensor from a predetermined value, causes a proportional servo-valve to admit hydraulic liquid from the actuator chamber of that strut at a flow rate proportional to the detected difference to return the strut length towards its predetermined value.

11 Claims, 3 Drawing Sheets

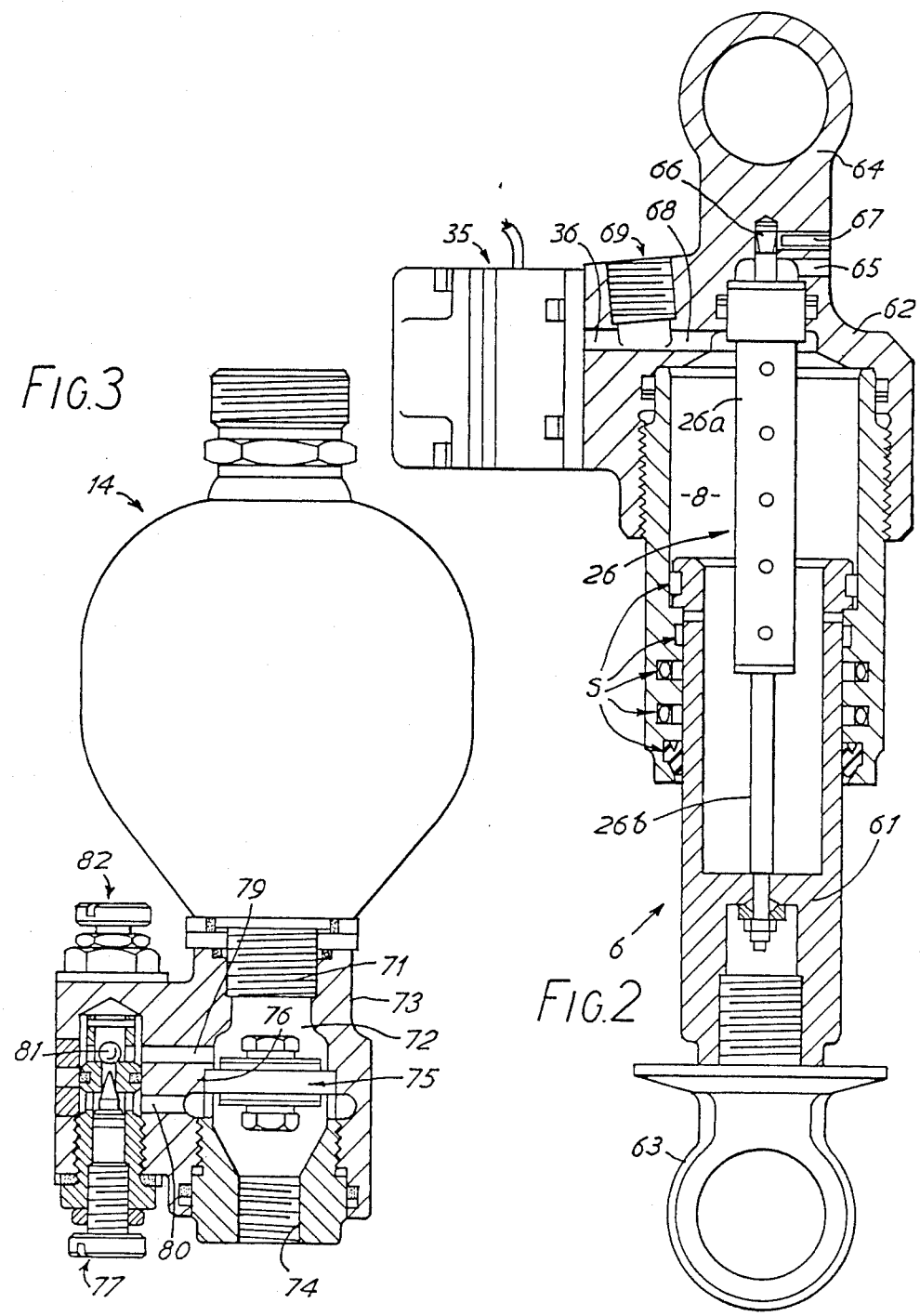

VEHICLE SUSPENSION SYSTEMS

The present invention relates to vehicle suspensions.

British Patent specification No. 1384454 has proposed a vehicle suspension system (hereinafter referred to as "a suspension system of the type defined") for a vehicle having a structure supported on at least two pairs of wheels by means of a liquid-filled strut for each wheel of first and second pairs of wheels, first and second valves controlled by sensors responsive to up-and-down movement of respective wheels of a first wheel pair to admit liquid under pressure or release liquid to or from a chamber of the respective struts to resist vehicle roll, a third valve controlled by a sensor responsive to up-and-down movement of the structure relative to the second pair of wheels to admit or release liquid under pressure to or from both struts of the second pair, the struts of the second pair each having a second liquid chamber the volume of which varies with the up-and-down movement, each such second chamber being in open communication with the chamber of a strut of the first pair so that the pressure in said second chamber of each strut of the second pair varies with the pressure in the first chamber of one of the struts of the first pair, the arrangemet being such that the changes of pressure in said second chambers produce roll resistance at the second pair of wheels in the same sense as the roll resistance produced at the first pair of wheels.

According to the invention, a suspension system of the type defined is modified in that each strut has a sensor associated therewith for indicating the amount and sense of departure from a datum position and the system includes means for controlling the flow rate through each valve to or from the associated struts in such a manner that each said flow rate is proportional to the sensed departure (or the algebraic sum of the sensed departures) from the datum position or positions, the direction of flow being such as to restore the associated strut or struts to datum position(s).

In the system proposed in GB No. 1384454, each valve, whenever it senses movement from a predetermined position opens fully to connect the associated strut or struts either fully to the high pressure source of liquid or fully to drain.

The invention will now be further described by way of example with reference to the accompanying drawing in which:

FIG. 2 shows a longitudinal section through a rear strut of the suspension shown in FIG. 1;

FIG. 3 shows a damper valve assembly in section; and

Figure 1:
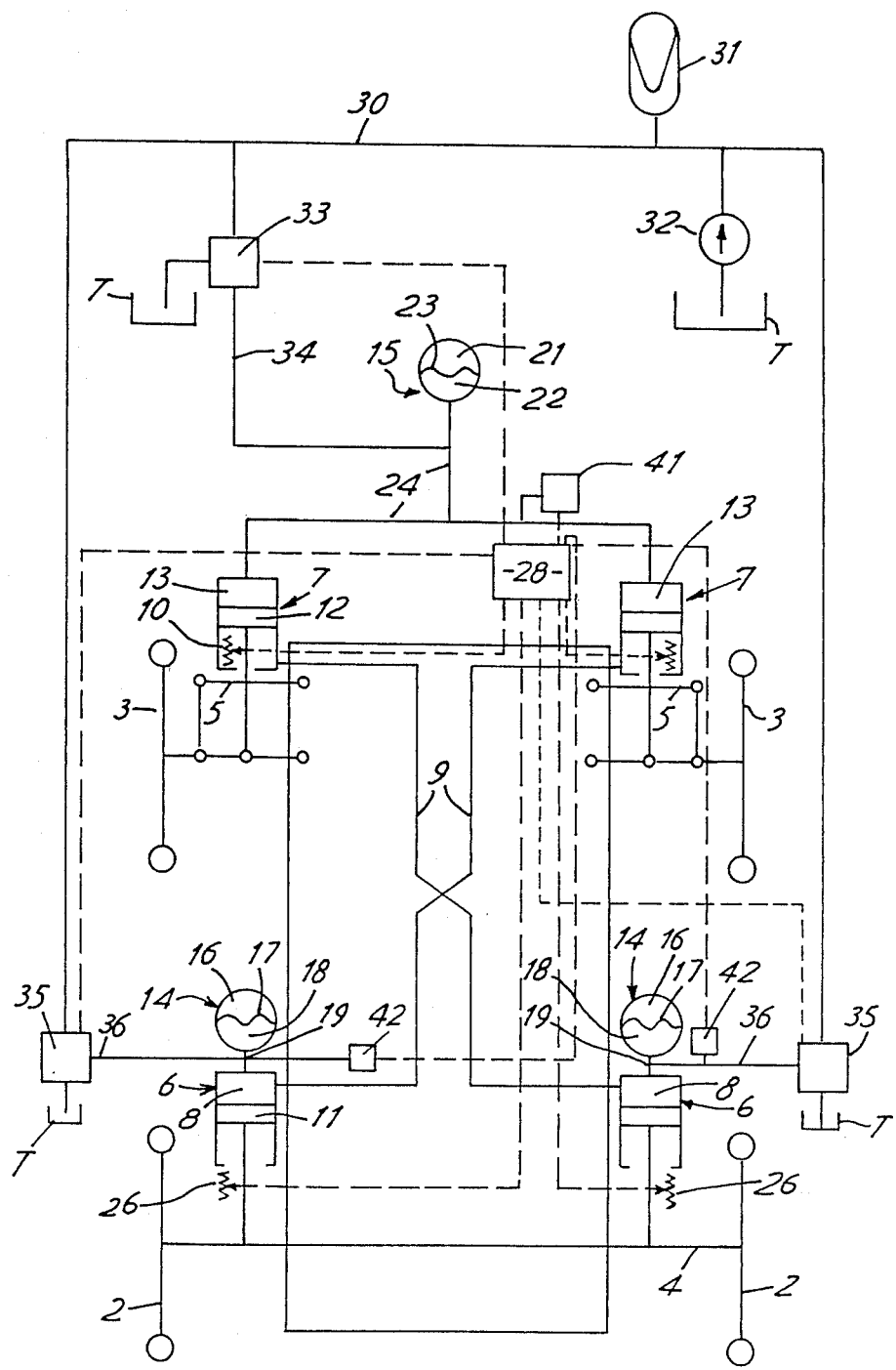
FIG. 1 shows diagrammatically a suspension system in accordance with the invention.

The suspension system shown in FIG. 1 serves to support a vehicle structure 1 on a pair of rear wheels 2 and a pair of steered front wheels 3. Each rear wheel 2 is connected to the structure for example by means of a swing axle 4 while each front wheel 3 is connected to the structure 1 by a suspension linkage 5. The structure 1 is also supported on the swing axles 4 and suspension linkages 5 by means of telescopic struts 6 and 7 at the rear and front of the vehicle respectively. Each of the rear struts 6 has a liquid chamber 8 of volume which varies in accordance with the length of the strut and which is connected by a line 9 to a liquid chamber 10 of the front strut on the opposite side of the vehicle. Whereas the liquid chambers 8 are formed in the upper parts of the struts 6, above the piston-forming portion 11 of the struts, the chambers 10 of the front struts 7 are formed below the pistons 12 of the front struts. Accordingly, liquid displaced from a rear chamber 8 by upward movement of the associated wheel 2 relative to the structure 1 will increase the volume of the chamber 10 of the front strut 7 on the opposite side of the vehicle, thereby shortening the effective length of this front strut and thus opposing vehicle roll.

Further variable-volume liquid chambers 13 are bounded within the front struts 7 by the pistons 12, on the opposite side of the pistons to the chambers 10.

The necessary resilience for the suspension is provided by two rear gas springs units 14 and one front gas spring unit 15. Each rear gas spring unit 14 has a gas-containing chamber 16 filled with gas to the required pressure to support the vehicle. The gas-containing chamber 16 is supported by a movable partition 17, here in the form of a diaphragm, from a liquid-containing chamber 18 connected to the associated suspension strut liquid chamber 8 by a line 19 to which the associated line 9 may conveniently be connected.

Similarly, the front gas spring unit 15 has a gas-containing chamber 21 precharged with gas under pressure and a liquid-containing chamber 22 separated from the gas-chamber 21 by a movable partition 23 in the form of a diaphragm. The liquid-containing chamber 22 is connected by lines 24 to both of the upper liquid chambers 13 of the two front suspension struts 7.

In accordance with the invention, each of the struts 6 and 7 has associated with it an extension sensor 26 and 27 respectively in the form of a potentiometer, the resistive element of which may be formed by an electrically conductive plastics material housed within the strut. Each potentiometer 26 and 27 is connected to an on-board computer 28 which cyclicly assesses the amount and direction by which the reading of each potentiometer differs from a predetermined datum value. In order to correct for such departures of the length of the liquid-filled suspension struts 6 and 7 from their predetermined lengths, further liquid under pressure can be admitted to the chambers 8 and 13 from a pressurized supply line 30 or some liquid can be allowed to escape to a reservoir 31. An engine-driven hydraulic pump 32 draws liquid from the reservoir 31 and delivers the liquid under pressure to a hydraulic pressure accumulator 33 and the line 30. The pump 32 may be driven for example from the engine camshaft and is preferably of the constant-pressure variabledelivery kind, for example a swash-plate pump, the pump delivery being controlled in known manner in accordance with the demand on the line 30.

The front levelling control valve 33 is connected by a line 34 to the line 24 and is also connected to the pressure supply line 30 and to the reservoir 31. Similarly, two rear levelling control valves 35 are connected by lines 36 to the lines 19 and are also connected to the pressure supply line 30 and the reservoir 31. Each of the three level control valves 33, 35 is electrically controlled by the computer 28 to which it is connected and is constructed to pass a flow of liquid at a flow rate determined by the control signal supplied to it by the computer 28. In the case of the two rear control valves 35, the flow rate into the associated strut chamber 8 from the line 30 or out of the chamber 8 to reservoir 31 is controlled by the valve 35 so as to be proportional to the amount by which the strut length differs from the predetermined value corresponding to a predetermined value of ride height. Liquid is admitted or withdrawn in accordance with whether the volume of the chamber 8 is reduced below the predetermined value or has increased above it respectively.

The computer 28 controls the single front levelling valve 33 effectively in accordance with the arithmetic mean of the readings of the two front potentiometers 27, the flow rate delivered by the valve 33 being proportional to the amount by which this arithmetic mean differs, positively or negatively from the predetermined value.

The suspension system may be damped in known manner by means of the damping characteristics of the gas spring units 15 and 14. By programming the computer 28 to assesess the length of the struts sufficiently frequently (e.g. sixty four times per second), the computer may assess the degree of damping which is achieved by the suspension. By providing the gas spring units 15 and 14 with variable damping control valves, the computer can be arranged for damping of the suspension in accordance with the requirements.

In order to compensate for the effect of radial compression of the vehicle tires on the side height, pressure sensors 41 and 42 may be connected to the hydraulic lines 24 and 19. Thus, for example, during heavy braking of the vehicle, with consequently greater load on, and compression of, the front tires, the pressure in the line 24 will be substantially increased. The computer 28 can be accordingly programmed to adjust the datum position for the front struts 7 to cause the valve 33 to admit further liquid from the line 30 and thus maintain the ride height of the front of the vehicle despite the tendancy of the vehicle to "dive" under heavy braking. Similarly, the front pressure sensor 41 and outer pressure sensor 42 when the vehicle is cornering hard, will cause the computer to cause the outer rear strut 6 to be lengthened to compensate for radial compression of the outer tires.

FIG. 2 shows one of the rear suspension struts 6 in axial section. The strut comprises a lower piston portion 61 slidable in an upper, barrel assembly 62 (with appropriate sealing means S), both assemblies having eyes 63 and 64 for articulation to a swing axle and the vehicle structure respectively. The body 26a of the potentiometer 26 has its upper end secured in a recess in the barrel assembly 62 which is formed with a passage 65 for leadwires (not shown) for connecting the potentiometer 26 to the computer. The slider (not shown) within the casing 26a is connected by a rod 26b to the lower part of the plunger 61. At its uppermost end, the housing 26a carries a peg 66 which is clamped by a set screw 67.

The variable-volume chamber 8 within the strut 6 is connected by a transverse bore 68 both to a port 69 for connection to the lines 9 and 19, a pressure sensor (not shown) connected to the computer, and to the passage 36 which is here formed by an extension of the bore 68 and leads into the leveling control valve 35. The valve 35 is a series E050 minature proportional servo-valve supplied by Moog Controls Limited of Ashchurch, Tewksbury, GL20 8NA, England. The valve has a polarized torque motor which moves a pilot valve element between two opposed inlet pilot orifices to throttle the flow through one or other of these orifices. The resultant differentials in the back pressures in these orifices are applied to opposite ends of a hydraulic servo spool-valve controlling the flow to or from the passage 36.

FIG. 3 shows a damper construction inserted between the line 19 and the gas spring 14 which is here in the form of a hydraulic pressure accumulator. The liquid port 71 is mounted in one end of a bore 72 extending through a damper housing 73 to a threaded connection 74 for the line 9. A disk-type damper valve 75 is slidable in an enlarged portion 76 of the bore 72 between two opposed shoulders. An adjustable throttle valve assembly 77 having an adjustable screw 78 with a conical end provides a preset flow resistance between passages 79 and 80 on opposite sides of the damper valve 75. A non return valve formed by a ball 81 allows flow through the valve 77 only in one direction. The resistance to flow in the opposite direction is independently adjustable by means of a similar assembly 82 connected in the opposite direction between the passages 79 and 80.

Figure 4:
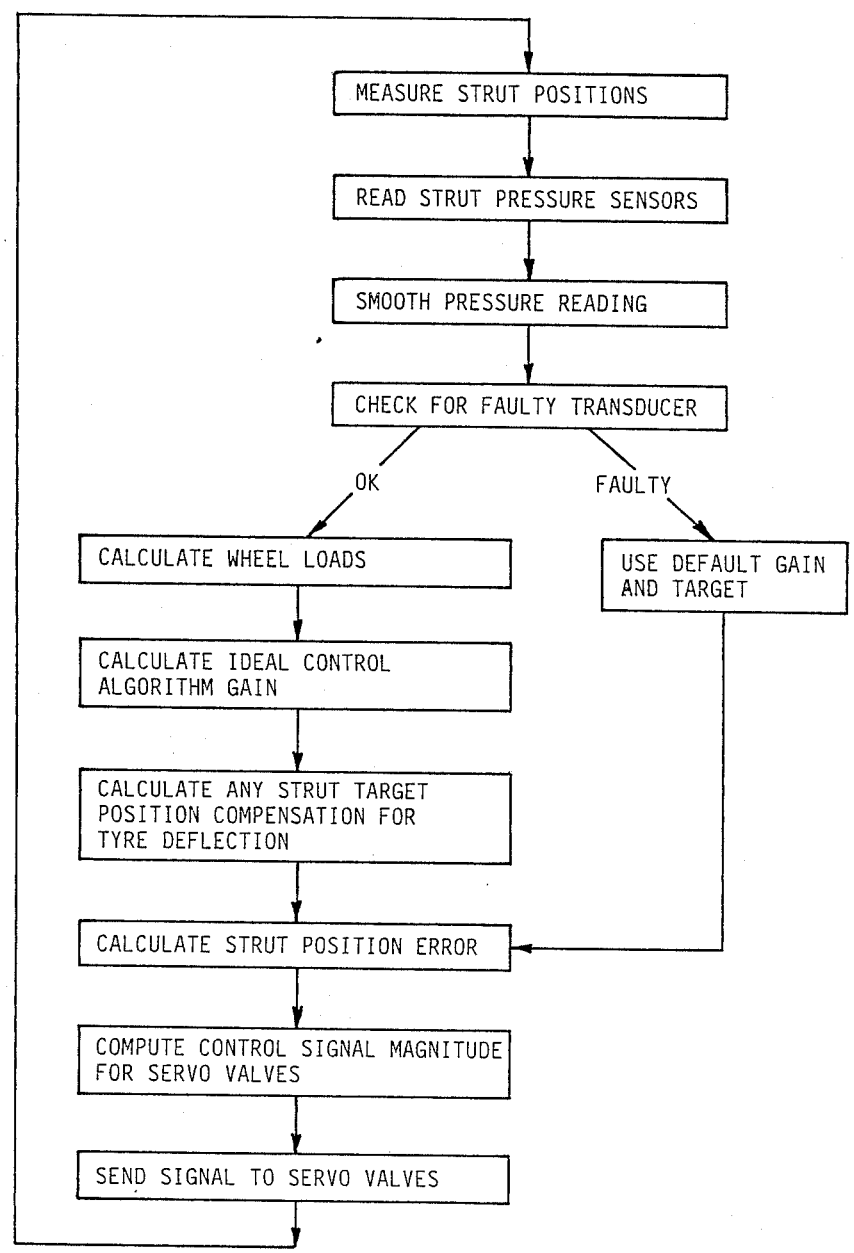
FIG. 4 shows a flow chart of the operations performed by the computer.

FIG. 4 shows a flow chart of the computing operations carried out by the computer.

It will of course be appreciated that the arrangement shown in the drawings may be used where the wheels 2 are the front, steered wheels and the wheels 3 are the rear wheels.

I claim:

1. A vehicle suspension system for a vehicle having a structure supported on at least two pairs of wheels by means of a liquid-filled strut for each wheel of first and second pairs of wheels, first and second valves controlled by sensors responsive to up-and-down movement of respective wheels of a first wheel pair to admit liquid under pressure or release liquid to or from a chamber of the respective struts to resist vehicle roll, a third valve controlled by a sensor responsive to up-and-down movement of the structure relative to the second pair of wheels to admit or release liquid under pressure to or from both struts of the second pair, the struts of the second pair each having a second liquid chamber the volume of which varies with up-and-down movement, each such second chamber being in open communication with the chamber of a strut of the first pair so that the pressure in said second chamber of each strut of the second pair varies with the pressure in the first chamber of one of the struts of the first pair, the arrangement being such that the changes of pressure in said second chambers produce roll resistance at the second pair of wheels in the same sense as the roll resistance produced at the first pair of wheels, wherein each strut has a sensor associated therewith for indicating the amount and sense of departure from a datum position and the system includes means for controlling the flow rate through each valve to or from the associated strut(s) in such a manner that each said flow rate is proportional to the sensed departure (or the algebraic sum of the sensed departures) from the datum position or positions, the direction of flow being such as to restore the associated strut or struts to the datum position(s).

2. A suspension system according to claim 1 and including damping means for the suspension, means for monitoring and assessing the instantaneous lengths of the struts sufficiently frequently to thereby assess the damping characteristics of the suspension, means for comparing the assessed damping characteristics with predetermined values and means to reduce differences between the assessed and predetermined damping.

3. A suspension according to claim 1, wherein pressure sensors are arranged to sense the pressures in the struts, and the flow rate control means are arranged to modify the flow rates through the valves to compensate for changes in radial compression of the vehicle tires corresponding to changes in the sensed strut pressures.

4. A suspension system according to claim 1, wherein the sensors are electrical sensors for producing and delivering to a computer an output signal representative of the length of the respective strut, and the said valves are electrically controlled hydraulic proportional servo-valves controlled by the computer.

5. A suspension system according to claim 4, wherein the sensors comprise potentiometers within the struts.

6. A vehicle suspension system for a vehicle having a body supported on wheels, comprising:

a plurality of struts adapted for attachment at one end to a vehicle body and at the other end to vehicle wheel assemblies, each said strut having a telescopic structure and being lengthwise adjustable to predetermined desired lengths to support a vehicle body at a desired travel height, said strut being lengthwise displaceable from a first said predetermined desired length by vehicle operating conditions, said strut being filled with liquid and arranged so that said lengthwise adjustment is controlled by an adjustment of volume of said liquid in said strut;

monitor means associated with each said strut for monitoring a strut operating length and assessing a displacement amount and a displacement direction by which said strut operating length differs from said frist predetermined desired length;

adjusting means responsive to said monitor means for adjusting each said strut through said displacement amount in said displacement direction from said operating length to said first desired length at a rate proportional to said displacement amount, including means for adjusting the volume of liquid in said strut at a rate proportional to said displacement amount;

pressure sensors for sensing liquid pressure in said struts; and compensation means responsive to said pressure sensors for changing said first desired length to a second desired length to compensate for changes in travel height caused by radial compression of vehicle tires.

7. A vehicle suspension system according to claim 6, wherein said monitor means includes potentiometers located in said struts.

8. A vehicle suspension system according to claim 7, wherein said monitor means includes a computer connected to said potentiometers.

9. A vehicle suspension system according to claim 6, wherein said adjusting means includes hydraulic proportional servo-valves.

10. A vehicle suspension system according to claim 9, wherein said adjusting means includes a computer connected to and controlling said servo-valves.

11. A vehicle suspension system according to claim 6, wherein said compression means includes a computer.

* * * * *